July 21, 1936. M. P. YOUKER 2,048,241
PROCESS AND APPARATUS FOR REMOVING HYDROGEN SULPHIDE FROM LIQUIDS
Filed March 30, 1933
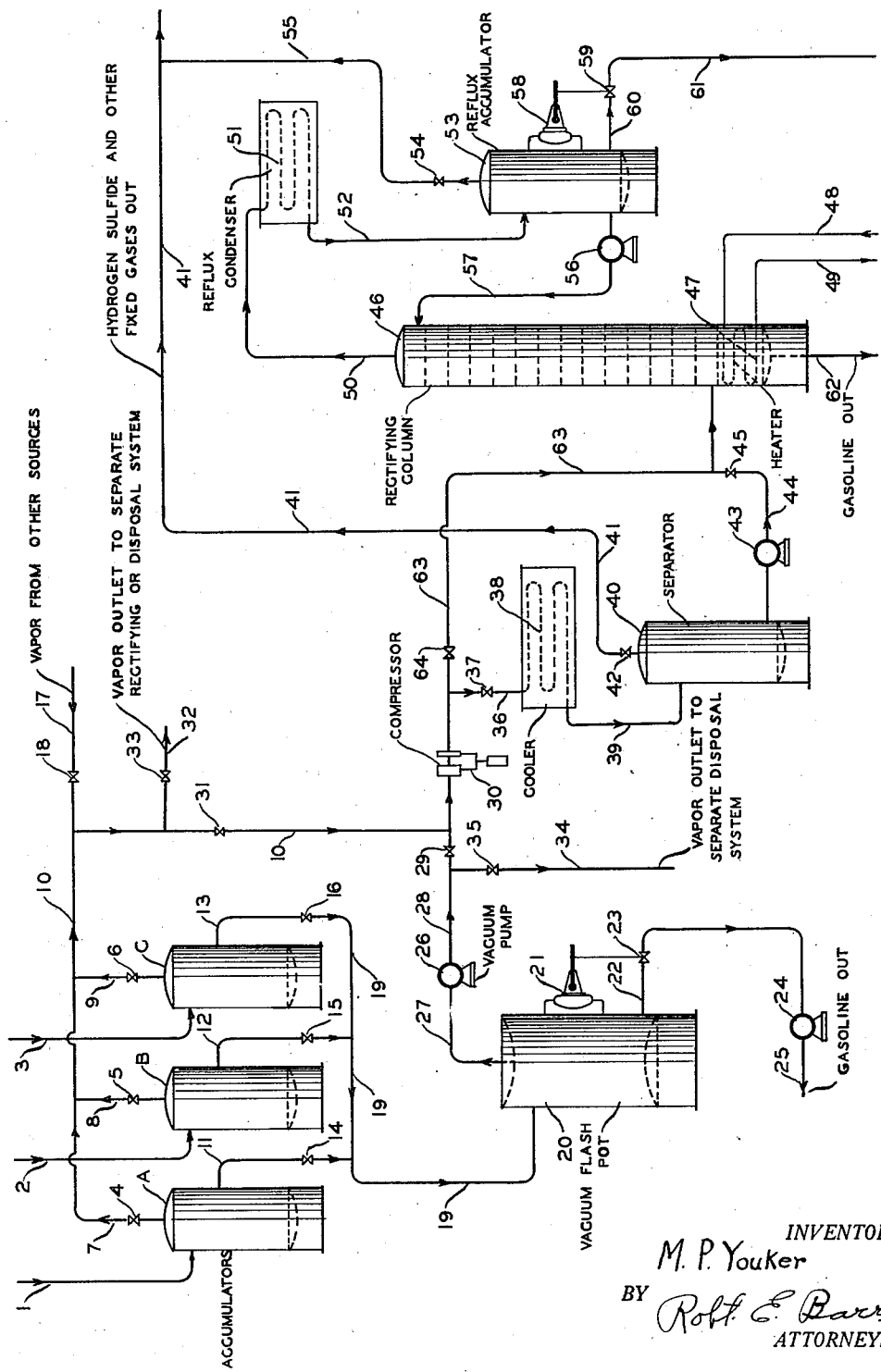
INVENTOR.
M. P. Youker
BY Robt. E. Barry
ATTORNEYS.

Patented July 21, 1936

2,048,241

UNITED STATES PATENT OFFICE 2,048,241

PROCESS AND APPARATUS FOR REMOVING HYDROGEN SULPHIDE FROM LIQUIDS

Malcolm P. Youker, Bartlesville, Okla., assignor to Phillips Petroleum Company, Bartlesville, Okla., a corporation of Delaware Application March 30, 1933, Serial No. 663,622

7 Claims. (Cl. 196—11)

This invention relates to an improved process and apparatus for removing hydrogen sulphide from liquids in which the gas is dissolved, and more especially to the removal of gaseous sulphur compounds from gasoline derived from crude or cracking stills, or from the products of distillation of oil shale or coal tar.

Ordinarily hydrogen sulphide is removed from liquid containing the same by means of water or an alkali wash. Where the amounts of hydrogen sulphide are small, such methods may be satisfactory, but frequently the amount of hydrogen sulphide dissolved is comparatively large, particularly when high sulphur petroleum oils are being distilled or when oil shale is being distilled. In such cases, large amounts of hydrogen sulphide are evolved, and the resulting distillates are frequently saturated with this undesirable gas, and its removal entails considerable cost in equipment and chemicals. My invention is designed to effect the removal of the major portion of the dissolved hydrogen sulphide in a highly economical and practical manner, without the use of chemicals or water washing.

My invention involves the application of vacuum to the hydrogen sulphide containing liquid, as a result of which the hydrogen sulphide (which is normally a gas and has therefore a much higher vapor pressure than the liquid in which it is dissolved) will distill from the liquid; the amount leaving the liquid being in relation to the absolute pressure maintained on the liquid. The hydrogen sulphide thus removed, together with any light vapors of the liquid which may be entrained by the gas, are then passed into a rectification system in which the hydrogen sulphide is finally removed from any liquid or liquefiable material by rectification. The liquid from which the hydrogen sulphide is removed is maintained at a sufficiently low temperature so that even high vacuum will not cause substantial vaporization of any of its constituents.

From the foregoing it will be understood that the primary object of my invention is to utilize suction for the removal of a large proportion of hydrogen sulphide and any vapors it may entrain from a liquid and to then rectify the mixture of hydrogen sulphide and vapors to sharply separate the hydrogen sulphide from the vapors.

With the foregoing objects outlined and with other objects in view which will appear as the description proceeds, the invention consists in the novel features hereinafter described in detail, illustrated in the accompanying drawing, and more particularly pointed out in the appended claims.

The drawing shows a diagrammatic side elevation of a suitable apparatus which may be used in practicing my process.

Referring to the drawing, A, B, and C designate accumulating tanks which receive distillate streams by means of pipes 1, 2, and 3 leading from condensers (not shown). These may be gasoline streams from several cracking or crude stills or other similar sources. The uncondensed gases accompanying the liquid into the accumulators, together with any vapors of the liquid which they may entrain, pass by means of pipes 7, 8, and 9 into a gas header 10. Valves 4, 5, and 6 in the respective pipes permit cutting the respective accumulators in or out of the gas header as may be desired. The gaseous fluid entering the gas header 10 may consist of gasoline vapors uncondensed at the temperature of the condensers and fixed gases including hydrogen sulphide undissolved in the gasoline, as well as mechanically entrained gasoline. This fluid may be joined by vapors from other sources such as hydrocarbon liquid storage tanks (not shown) by means of conduit 17. A valve 18 in this conduit permits or prevents entrance of such vapors as the case may be.

The raw gasoline which collects in the accumulators A, B, and C is withdrawn through branches 11, 12, and 13 respectively, which are provided with respective valves 14, 15, and 16, to permit inclusion or exclusion of any of the several accumulators in the system as may be desired. The gasoline passes through these branch lines 11, 12, and 13 into a raw gasoline header 19 which leads to a vacuum flash pot 20 in which sub-atmospheric pressure is maintained, ranging from a few millimeters to several inches of mercury. Such low pressures cause the hydrogen sulphide and any other fixed gases dissolved or occluded in the gasoline to separate from the liquid in the vessel 20 because of their comparatively high vapor pressures, and to distill from the gasoline. A liquid level control device 21 regulates the withdrawal of the gas-free gasoline through line 22 and valve 23 by a pump 24 which forces the gasoline through pipe 25 to chemical treating means or storage means (not shown).

A vacuum pump 26 which maintains the desired sub-atmospheric pressure on the flash pot 20, also serves to withdraw the evolved gases through a line 27 and forces them through a line 28 having in it a valve 29, and thence into line 63, so that the gaseous fluids from 10 and 28 may be mixed before entering a compressor 30.

If it is desired to treat the gaseous material from the flash pot 20 separately from that coming from the accumulators A, B, and C through the line 10, a valve 31 in the line 10 is closed and the gaseous material passing through line 10 may be diverted through line 32 and valve 33 which is opened for this purpose. The line 32 may lead to a separate rectifying system, (not shown), or any other disposal system.

If it is desired to process the gases from line 10 through the subsequently to be described rectification system and the gases from line 28 excluded, valve 33 is closed, valve 31 opened, valve 29 closed, and the gases in line 28 diverted through line 34 by opening valve 35. Line 34 may lead to any other disposal system, not shown.

If desirable to process the gases from line 28 and line 10 together, valves 33 and 35 are closed and valves 29 and 31 opened and the mixed gases then pass to the compressor 30 which compresses them to any desired super-atmospheric pressure and forces them through line 36 valve 37 into cooler 38 in which those components of the gaseous mixture which are liquid at the temperatures and pressure employed condense and together with the uncondensed gases pass through line 39 into a separator 40. The uncondensed gases which contain the larger portion of the hydrogen sulphide leave separator 40 through pipe 41 having a back pressure valve 42 interposed therein for maintaining the desired super-atmospheric pressure for example, between 100 and 300 pounds per square inch on the separator 40.

The liquefied gasoline collecting in separator 40 will contain some dissolved fixed gases and some hydrogen sulphide and consequently this gasoline is forced by a pump 43 through a conduit 44 and valve 45 into a rectifying column 46.

The lower portion of the rectifying column 46 has a heating coil 47 heated by any suitable heating fluid which enters through line 48 and discharges through line 49.

The heating in the column 46 causes the fixed gases, including hydrogen sulphide, and light vapors contained in the gasoline entering the rectifying column 46 to flash out of the mixture and pass up through the column where they are subjected to suitable reflux, so that only those components which it is desired to retain in the rectified gasoline are condensed and returned to the bottom of the column. The undesired gaseous components, including the remainder of the hydrogen sulphide, leave the column 46 through line 50, and pass through a reflux condenser 51 in which the liquefiable portions condense, and together with the permanent gases, pass through a pipe 52 into a reflux accumulator 53. Gases which separate from the liquid in the accumulator 53 pass through a pipe 55 having a backpressure valve 54 and are discharged preferably into the conduit 41 which leads to any disposal means, not shown. The valve 54 serves to maintain any desired superatmospheric pressure on the reactification system.

A portion of the liquid collecting in the reflux accumulator 53 is returned by means of a pump 56 through a line 57 into the upper portion of the rectifying column 46. Any excess liquid from accumulator 53 is released automatically by means of a liquid level control device 58 which operates a valve 59 in a line 60 that discharges into a pipe 61 leading to storage, not shown. Material discharged through line 61 may pass to a gas conversion system for conversion into heavier materials.

Rectified hydrogen-sulphide-free gasoline collecting in the bottom of the column 46 is discharged through line 62 and passes to storage, not shown, or it may be mixed with the raw gasoline discharged through line 25.

If it is desired to rectify and purify the gaseous fluid coming from the flash pot 20 through line 28 entirely separately from any other gaseous material, valve 31 is closed and valve 33 opened excluding the other gases, valve 35 closed and valve 29 opened. The gases from line 28 then pass to the compressor 30 and by closing valve 37 the compressed gases pass into line 63 having a valve 64 which is opened for the purpose and pass without cooling directly into the rectifying column, valve 45 being closed to prevent the gases backing up into the cooling system. In this way the heat contained in the compressed gases is utilized for the subsequent rectification steps in the column 46.

By this system I can remove in excess of 50% of the hydrogen-sulphide content of the raw gasoline and effect a corresponding saving in cost of chemical treatment.

While I have disclosed what I now consider to be a preferred mode of and apparatus for practicing the invention, it is manifest that changes may be made in the method and structure outlined without departing from the spirit of the invention, as expressed in the claims.

What is claimed and desired to be secured by Letters Patent is:

1. An apparatus for removing hydrogen sulphide gas from petroleum distillates, comprising a vacuum flash pot, a pipe for discharging gasoline from the lower portion of said pot, a pipe for introducing petroleum distillates into the pot, a conduit for withdrawing a gaseous mixture from the upper portion of the pot, a vacuum pump in the conduit, a compressor interposed in the conduit posterior to the vacuum pump for placing said mixture under compression, a cooler for the mixture having its inlet connected to the outlet end of said conduit, a separator, a pipe placing the separator in communication with the outlet of the cooler, a gas vent pipe leading from the upper end of the separator and having a back pressure valve interposed therein for maintaining pressure in the separator, a rectification column, a conduit for leading condensate from the separator to the rectifying column at a point between the top and bottom of the latter, means for heating the lower portion of said rectifying column, a conduit leading from the lower portion of the rectifying column for discharging gasoline from the column, and means including a back pressure valve for discharging gases from the upper portion of said rectifying column.

2. A process for removing hydrogen-sulphide gas from raw gasoline comprising applying sub-atmospheric pressure to said raw gasoline and thereby separating a mixture of hydrogen-sulphide gas, other gases and hydrocarbon vapors from said raw gasoline while maintaining the raw gasoline at a sufficiently low temperature to prevent substantial vaporization of any of its liquid constituents, and then rectifying said mixture and thereby separating said hydrogen-sulphide gas and other gases from said hydrocarbon vapors.

3. A process for removing hydrogen-sulphide gas from raw gasoline comprising applying sub-atmospheric pressure to said raw gasolines and thereby separating a mixture of hydrogen-sulphide gas, other gases and hydrocarbon vapors from said raw gasoline while maintaining the raw gasoline at a sufficiently low temperature to prevent substantial vaporization of any of its liquid constituents, and then rectifying said mixture and thereby separating said hydrogen-sulphide gas and other gases from said hydrocarbon vapors, said rectification being conducted under super-atmospheric pressure and out of the presence of said raw gasoline.

4. A process for removing hydrogen-sulphide gas from petroleum distillates comprising applying sub-atmospheric pressures to said distillate and thereby separating a mixture of hydrogen-sulphide gas, other gases and hydrocarbon vapors from said distillates while maintaining the distillates at a sufficiently low temperature to prevent substantial vaporization of its liquid constituents, cooling said mixture, and then rectifying said mixture under super-atmospheric pressure and thereby separating said hydrogen-sulphide gas and other gases from said hydrocarbon vapors.

5. A process for removing hydrogen-sulphide gas from petroleum distillates comprising placing such a distillate in an accumulator zone, passing a stream of uncondensed gases from said zone, passing a second stream of liquid distillate from said zone into a vacuum zone, applying sub-atmospheric pressure to the distillate in the vacuum zone and thereby separating a mixture of hydrogen-sulphide gas, other gases and hydrocarbon vapors from said distillate while maintaining the distillate in the vacuum zone at a sufficiently low temperature to prevent substantial vaporization of its liquid constituents, admixing a stream of said mixture with the first mentioned stream of uncondensed gases, and then rectifying the materials of the combined streams and thereby separating said hydrogen-sulphide gas and said other gases from said hydrocarbon vapors.

6. A process for removing hydrogen-sulphide gas from petroleum distillates comprising placing such a distillate in an accumulator zone, passing a stream of uncondensed gases from said zone, passing a second stream of liquid distillate from said zone into a vacuum zone, applying sub-atmospheric pressure to the distillate in the vacuum zone and thereby separating a mixture of hydrogen-sulphide gas, other gases and hydrocarbon vapors from said distillate while maintaining the distillate in the vacuum zone at a sufficiently low temperature to prevent substantial vaporization of its liquid constituents, admixing a stream of said mixture with the first mentioned stream of uncondensed gases, and then rectifying the materials of the combined streams and thereby separating said hydrogen-sulphide gas and said other gases from said hydrocarbon vapors, the materials of the combined streams being rectified under super-atmospheric pressure while out of the presence of said distillate.

7. A process for removing hydrogen-sulphide gas from raw gasoline, comprising subjecting said gasoline to sub-atmospheric pressure ranging from a few millimeters to several inches of mercury in a vacuum zone, and thereby separating a mixture of hydrogen sulphide gas, other gases and hydrocarbon vapors from said raw gasoline while maintaining the raw gasoline at a sufficiently low temperature to prevent substantial vaporization of any of its liquid constituents, and afterwards feeding said mixture under pressure into a rectifying zone maintained at a pressure between 100 and 300 pounds per square inch, applying heat to the lower portion of the rectifying zone, applying a controlled reflux to the upper portion of the rectifying zone, and rectifying said mixture in the rectifying zone and thereby separating said hydrogen-sulphide gas and said other gases from said hydrocarbon vapors.

MALCOLM P. YOUKER.